United States Patent
Robbins, III

[19]

[11] Patent Number: 5,971,216
[45] Date of Patent: Oct. 26, 1999

[54] MEASURING CANISTER WITH SLIDING CLOSURE

[76] Inventor: Edward S. Robbins, III, 128 Hazelwood La., Florence, Ala. 35630

[21] Appl. No.: 09/040,117

[22] Filed: Mar. 17, 1998

Related U.S. Application Data

[63] Continuation-in-part of application No. 29/080,064, Nov. 26, 1997, Pat. No. Des. 405,703, which is a continuation-in-part of application No. 29/080,069, Nov. 26, 1997, Pat. No. Des. 403,601.

[51] Int. Cl.⁶ .................................................. G01F 11/26
[52] U.S. Cl. ........................... 222/158; 222/453; 222/456
[58] Field of Search .................................... 222/158, 454, 222/456, 453, 441

[56] References Cited

U.S. PATENT DOCUMENTS

| | | | |
|---|---|---|---|
| D. 369,755 | 5/1996 | Burcham et al. | D10/46.2 |
| 1,066,384 | 7/1913 | Desmarais | 222/456 |
| 1,273,012 | 7/1918 | Souther . | |
| 2,025,796 | 12/1935 | Waldheim | 221/98 |
| 2,619,264 | 11/1952 | Sprucinski | 222/456 |
| 2,739,741 | 3/1956 | Barnett | 222/456 |
| 2,799,436 | 7/1957 | Bernhardt | 222/429 |
| 2,844,266 | 7/1958 | Hofe | 215/64 |
| 3,036,742 | 5/1962 | Wagoner et al. | 222/158 |
| 3,148,804 | 9/1964 | James | 222/158 |
| 3,168,223 | 2/1965 | Capers | 222/158 |
| 3,209,961 | 10/1965 | Wassell | 222/443 |
| 3,353,725 | 11/1967 | Caceres | 222/456 |
| 3,924,472 | 12/1975 | Harris | 73/426 |
| 3,948,105 | 4/1976 | Johnson, Jr. | 73/427 |
| 4,144,989 | 3/1979 | Joy | 222/438 |
| 4,164,301 | 8/1979 | Thayer | 220/253 |
| 4,637,529 | 1/1987 | Knight | 222/452 |
| 4,779,771 | 10/1988 | Song | 222/456 |
| 4,782,984 | 11/1988 | Su | 222/456 |
| 5,186,366 | 2/1993 | Meisner et al. | 222/158 |
| 5,261,575 | 11/1993 | Keller | 222/455 |
| 5,265,776 | 11/1993 | Shabestari | 222/454 |
| 5,467,903 | 11/1995 | Sorensen et al. | 222/455 |
| 5,480,071 | 1/1996 | Santagiuliana | 222/455 |
| 5,495,964 | 3/1996 | Santagiuliana | 222/455 |
| 5,518,152 | 5/1996 | Burcham et al. | 222/452 |
| 5,547,109 | 8/1996 | Robbins, III | 222/158 |
| 5,588,563 | 12/1996 | Liu | 222/158 |
| 5,601,213 | 2/1997 | Daniello | 222/456 |
| 5,667,106 | 9/1997 | Robbins, III | 222/158 |

*Primary Examiner*—Philippe Derakshani
*Attorney, Agent, or Firm*—Locke Reynolds

[57] ABSTRACT

A measuring canister including a bottom and a side wall connected to the bottom defining an interior of the canister, a partition dividing the interior into a storage compartment and a measuring dispensing compartment, and an upwardly domed cover including a dispensing orifice removably attached to an upper margin of the side wall so that the dispensing orifice is located only over the measuring dispensing compartment. A closure is slidably disposed inside the cover, and is movable between an open position allowing material to be dispensed from the measuring dispensing compartment and a closed position preventing the material from being dispensed. The closure includes an inside surface for facilitating material exchange between the storage and measuring dispensing compartments while the closure is in the closed position, and a downwardly depending flange having a lower margin which is proximate to an upper margin of the partition, for preventing material from being exchanged between the storage and the measuring dispensing compartments while the closure is in the open position. A manually operable tab projects upward from the closure through the dispensing orifice to assist in displacing the closure between the open and closed positions.

18 Claims, 9 Drawing Sheets

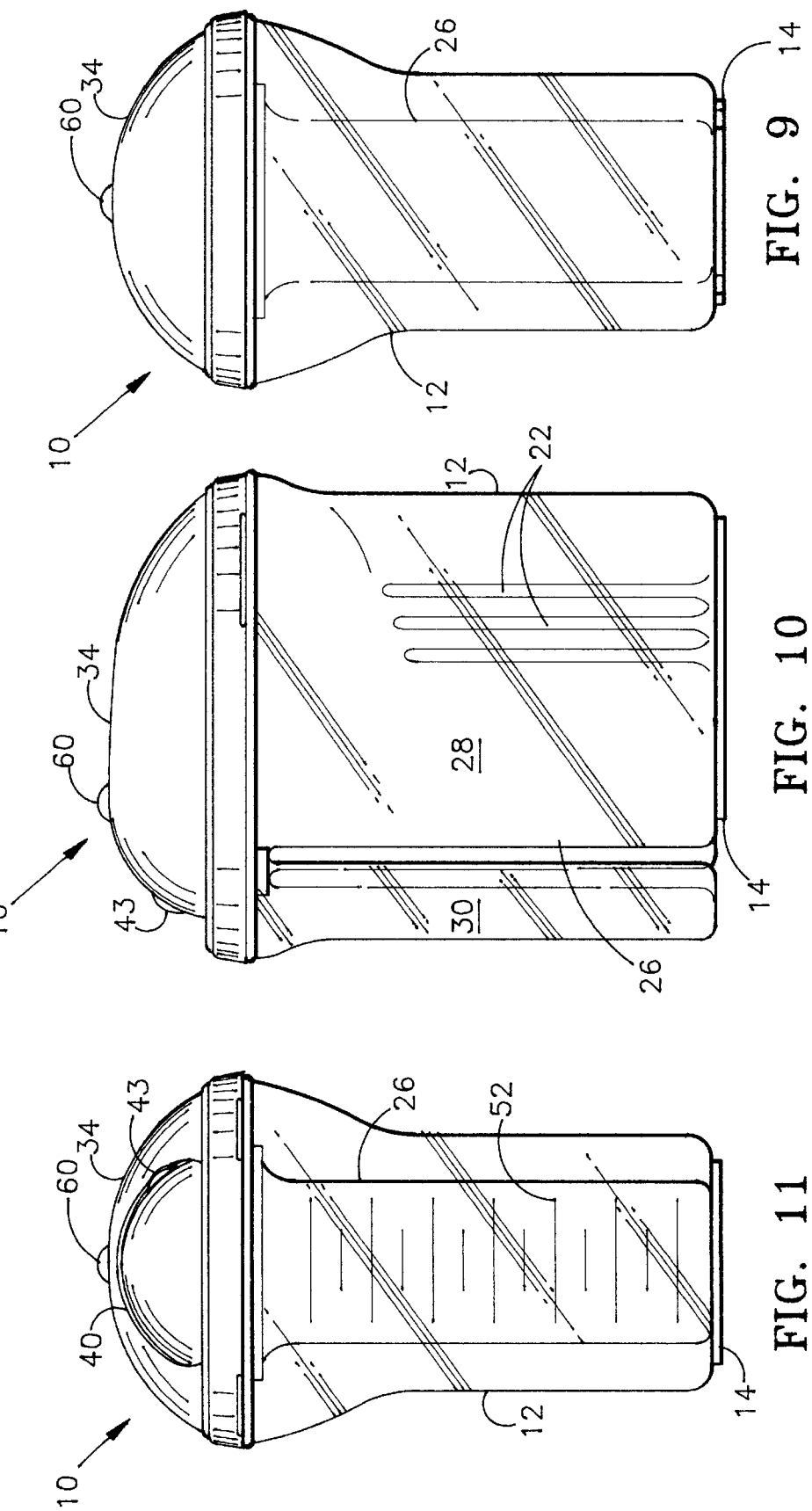

MEASURING CANISTER WITH SLIDING CLOSURE

CROSS-REFERENCE TO RELATED APPLICATIONS

This is a continuation-in-part of application Ser. No. 29/080,064, filed Nov. 26, 1997, now U.S. Pat. No. D405,703, which is a c-i-p of application Ser. No. 29/080,069, filed Nov. 26, 1997 now U.S. Pat. No. D403,601.

BACKGROUND OF THE INVENTION

1. Field of the Invention

The present invention generally relates to canisters for the storage and dispensing of liquids and particulate solids, and more particularly concerns canisters of the type that are capable of dispensing a stored liquid or particulate solid in a measured amount that may be selected by the user.

2. Description of the Prior Art

There are presently available a number of canisters that may be used to store liquids or particulate solids and, in addition, are capable of dispensing a portion of the liquid or particulate solid. Such devices include canisters where the user may select a volume, up to a specified maximum volume, of a particulate solid or liquid to be dispensed through a closure flap disposed approximate to the bottom of the canister, such as that described in U.S. Pat. No. 2,819,000. Also, there are presently available canisters where a single, predetermined volume of a particulate solid may be dispensed, such as that described in U.S. Pat. No. 4,637,529, and, in addition, canisters where the user may select one of a number of predetermined volumes of a particulate solid to be dispensed, such as that described in U.S. Pat. No. 4,782,984. Further, current canisters include those having a flap that is movable in hinged rotation to open and close a dispensing orifice and simultaneously close and open a passage between a storage compartment and a measuring dispensing compartment, such as the inventor's U.S. Pat. No. 5,518,152.

Despite the availability of such canisters, there exists a need in the art for an improved measuring canister that is capable of conveniently storing any of a wide variety of liquids or particulate solids, yet is capable of dispensing a measured portion of the liquid or particulate solid in a controlled manner, with the volume of material to be dispensed selected by the user to be any volume up to a maximum volume, and simultaneously preventing the remaining stored material from being dispensed or spilled during the dispensing operation.

SUMMARY OF THE INVENTION

In order to aid in the understanding of the present invention, it can be stated in essentially summary form that it is directed to a measuring canister that is capable of storing any of a variety of liquid or particulate solids and dispensing therefrom in a controlled manner a measured portion of the liquid or particulate solid, the measured portion selected by the user to be any volume up to a maximum volume, while simultaneously preventing the remaining stored material from spilling or being dispensed.

More specifically, the present invention is directed to a measuring canister having a continuous side wall attached to a bottom, defining an interior of the canister. The side wall may include a graspable region, and a generally planar partition is disposed within the interior. The partition acts to divide interior into a storage compartment and a measuring dispensing compartment. A generally upwardly domed cover is removably joined to an upper margin of the side wall. The cover defines a dispensing orifice located only over the measuring dispensing compartment. A closure is slidably disposed within the cover, and is linearly movable between a closed position and an open position. In the closed position, material within the measuring dispensing compartment is prevented from being dispensed from the measuring canister, with the closure acting to close the dispensing orifice. In the open position, material within the measuring dispensing compartment may be dispensed through the dispensing orifice.

The closure includes an inside surface for facilitating material exchange between the storage compartment and the measuring dispensing compartment while the closure is in the closed position. The closure includes a generally downwardly depending flange, with the dimensions and location of the flange selected so that a lower margin of the flange is disposed proximate to an upper margin of the partition when the closure is in the open position, so that material is prevented from being exchanged between the storage compartment and the measuring dispensing compartment. When the closure is in the closed position, the lower margin of the flange is separated from the upper margin of the partition, and material may be exchanged between the storage compartment and the measuring dispensing compartment.

The side wall may be formed of a material that is at least partially sufficiently translucent to permit a user to visually determine the amount of material present in the measuring dispensing compartment. Further, at least a portion of the side wall proximate to the measuring dispensing compartment may include volumetric indicia whereby a user may determine the volume of material contained in the measuring dispensing compartment.

The upper margin of the partition may lie substantially below the upper margin of the side wall, and the flange may project generally downward from the closure to be substantially outside an envelope defined by a perimeter of the cover and in proximity to the upper margin of the partition. As an alternative, the upper margin of the partition may lie substantially coplanarly with the upper margin of the side wall, so that the flange may be generally confined within the envelope defined by the perimeter of the cover while being proximate to the upper margin of the partition.

In use, the cover may be removed from the side wall and a desired material placed in the storage compartment and the cover reattached. With the closure in the closed position, the measuring canister may be tilted to elevate the storage compartment with respect to the measuring dispensing compartment until a desired amount of the material is transferred from the storage compartment, over the partition, and into the measuring dispensing compartment. Material is prevented from being dispensed from the measuring canister during this operation as the closure closes the dispensing orifice. By visual inspection through the at least partially sufficiently translucent side wall, a user may determine whether the desired volume of material has been transferred to the measuring dispensing compartment, using the indicia. When the desired volume of material is present in the measuring dispensing compartment, the closure may be moved to the open position, where the flange is disposed proximate to the upper margin of the partition, thereby blocking material from transfer between the storage compartment and the measuring dispensing compartment, and simultaneously uncovering the orifice. By tilting the measuring canister, material within the measuring dispensing compartment is then dispensed, while material within the storage compartment is prevented from moving to the measuring dispensing compartment or from being dispensed from the measuring canister.

In a second embodiment, the partition is generally arcuate and the closure is generally disk shaped and defines a cutout portion adjacent to the flange which is also generally arcuate in shape. The dimensions of the cutout portion are chosen to correspond with the dimensions of the dispensing orifice, and a closure is rotationally movable about a vertical axis between a closed position and an open position. Rotation of the closure with respect to the cover is facilitated by a retainer pin disposed through a cover hole defined through the cover and a closure hole defined through the closure.

When the closure is in the open position, the lower margin of the flange is disposed proximate to the upper margin of the partition, preventing material from being exchanged between the storage compartment and the measuring dispensing compartment. When the closure is disposed in the closed position, the lower margin of the flange is separate from the upper margin of the partition, and material may be exchanged between the storage compartment and the measuring dispensing compartment.

BRIEF DESCRIPTION OF THE DRAWINGS

FIG. 9 is a front elevation view of a measuring canister representing a second embodiment of the present invention.

FIG. 10 is a side elevation view of a measuring canister representing a second embodiment of the present invention, depicted with the closure in the closed position.

FIG. 11 is a rear elevation view of a measuring canister representing a second embodiment of the present invention, depicted with the closure in the closed position.

DESCRIPTION OF THE PREFERRED EMBODIMENTS

Figure 1:
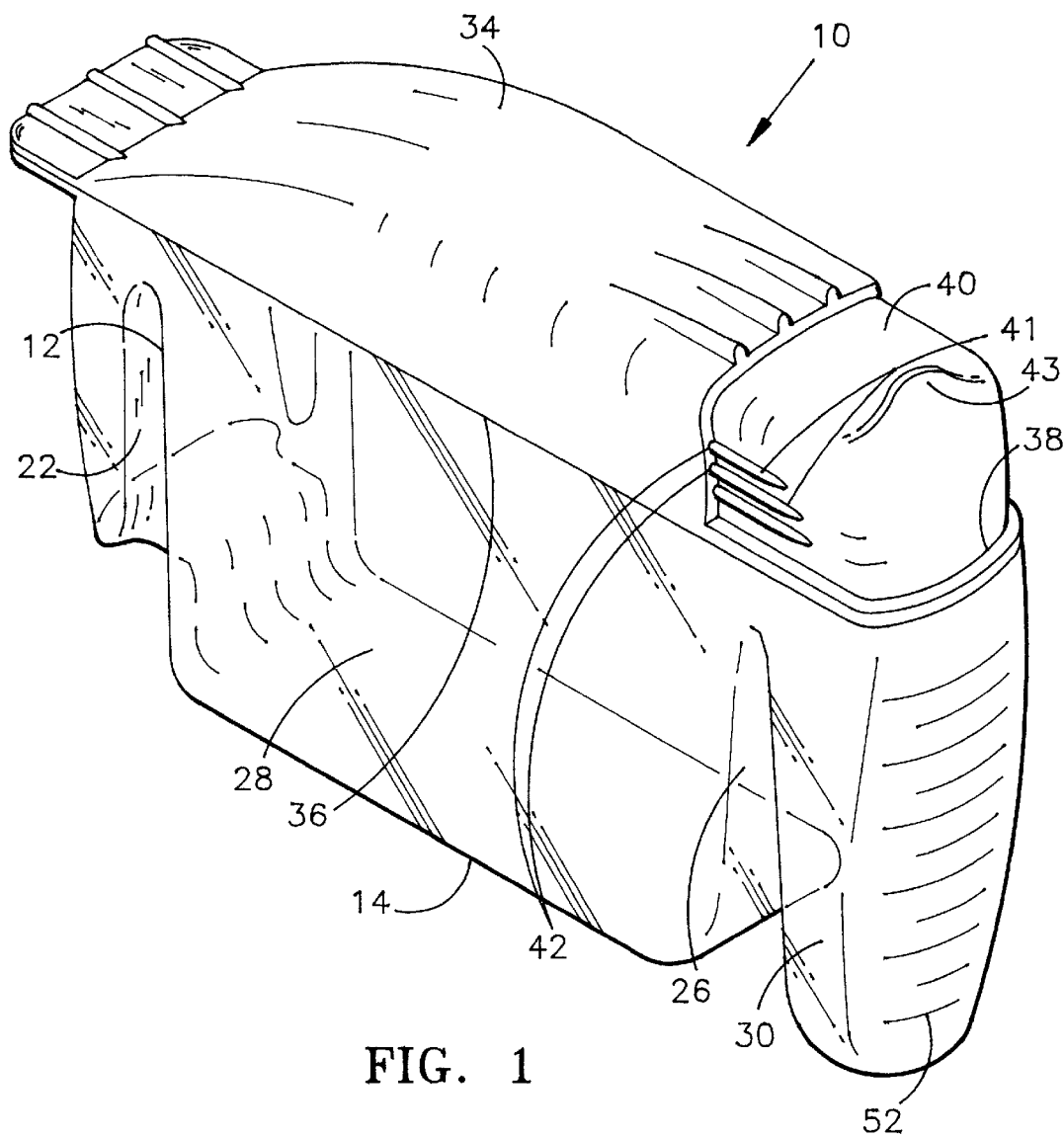
FIG. 1 is a perspective view of a measuring canister representing the present invention, depicted with the closure in the closed position.

The following portion of the specification, taken in conjunction with the drawings, sets forth the preferred embodiments of the present invention. The embodiments of the invention disclosed herein are the best mode contemplated for carrying out this invention in a commercial environment, although it should be recognized and understood that various modifications can be accomplished within the parameters of the present invention.

Turning now to the drawings for a detailed description of the present invention, reference is first made to FIGS. 1–5, generally depicting measuring canister 10 having continuous side wall 12 attached to bottom 14, thereby defining interior 20 of canister 10. Side wall 12 may be formed to define graspable region 22. Generally planar partition 26 is disposed within interior 20, and acts to divide interior 20 into storage compartment 28 and measuring dispensing compartment 30. Generally upwardly domed cover 34 is removably joined to upper margin 36 of side wall 12, whereby refilling of measuring canister 10 may be accomplished. Cover 34 defines dispensing orifice 38 located only over measuring dispensing compartment 30.

Figure 2:
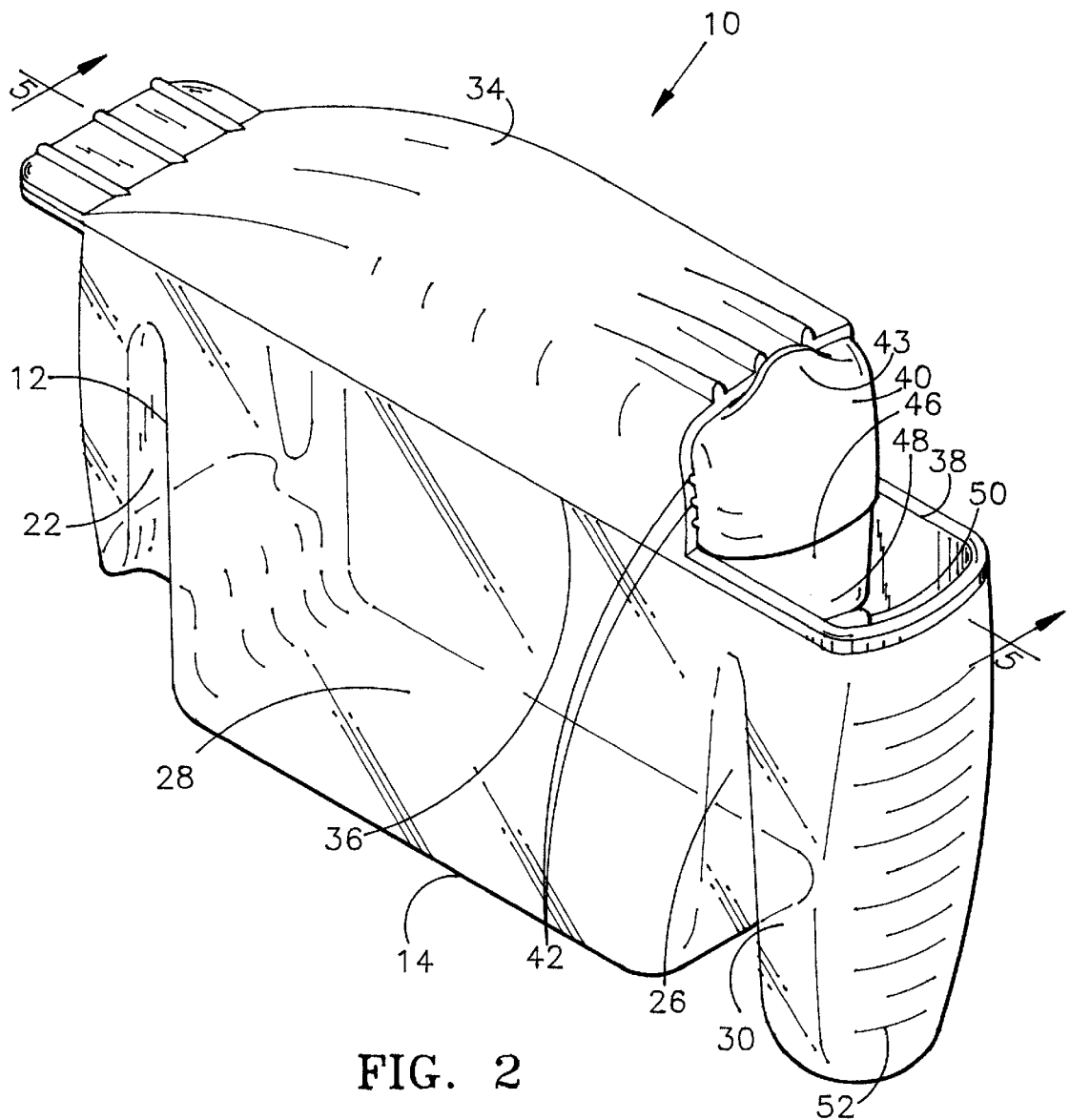
FIG. 2 is a perspective view of a measuring canister representing the present invention, depicted with the closure in the open position.
Figure 3:
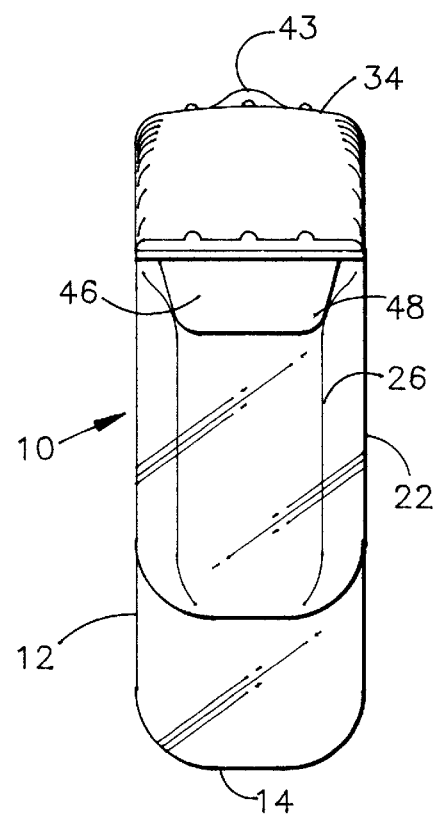
FIG. 3 is a rear elevation view of a measuring canister representing the present invention.

Closure 40 is slidably disposed within cover 34, and is linearly movable between a closed position, illustrated in FIG. 1, and an open position, illustrated in FIG. 2. In the closed position, material within measuring dispensing compartment 30 is prevented from being dispensed from measuring canister 10, as closure 40 acts to close dispensing orifice 38. In the open position, material within the measuring dispensing compartment 30 may be dispensed through dispensing orifice 38. Further, closure 40 may be slidably mounted to cover 34 using a plurality of linear ridges 41 disposed along side portions of closure 40 and engaged within a plurality of corresponding grooves 42 defined by cover 34. Movement of closure 40 may be facilitated by manually operable tab 43 projecting generally upward from closure 40 through orifice 38.

Figure 4:
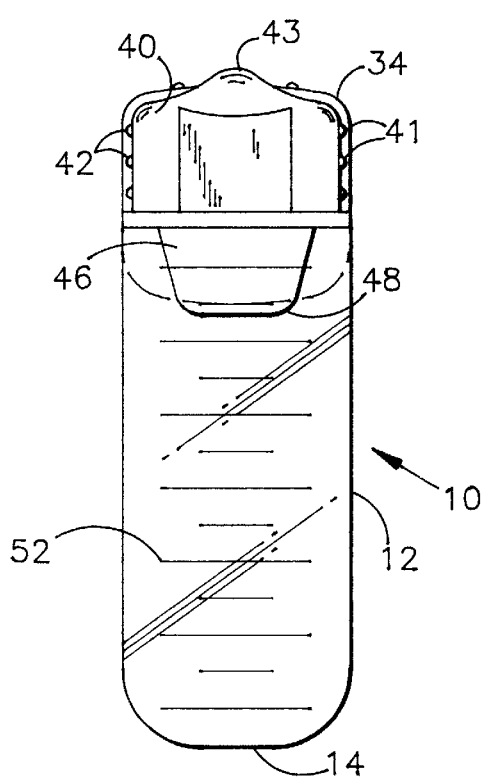
FIG. 4 is a front elevation view of a measuring canister representing the present invention.
Figure 5:
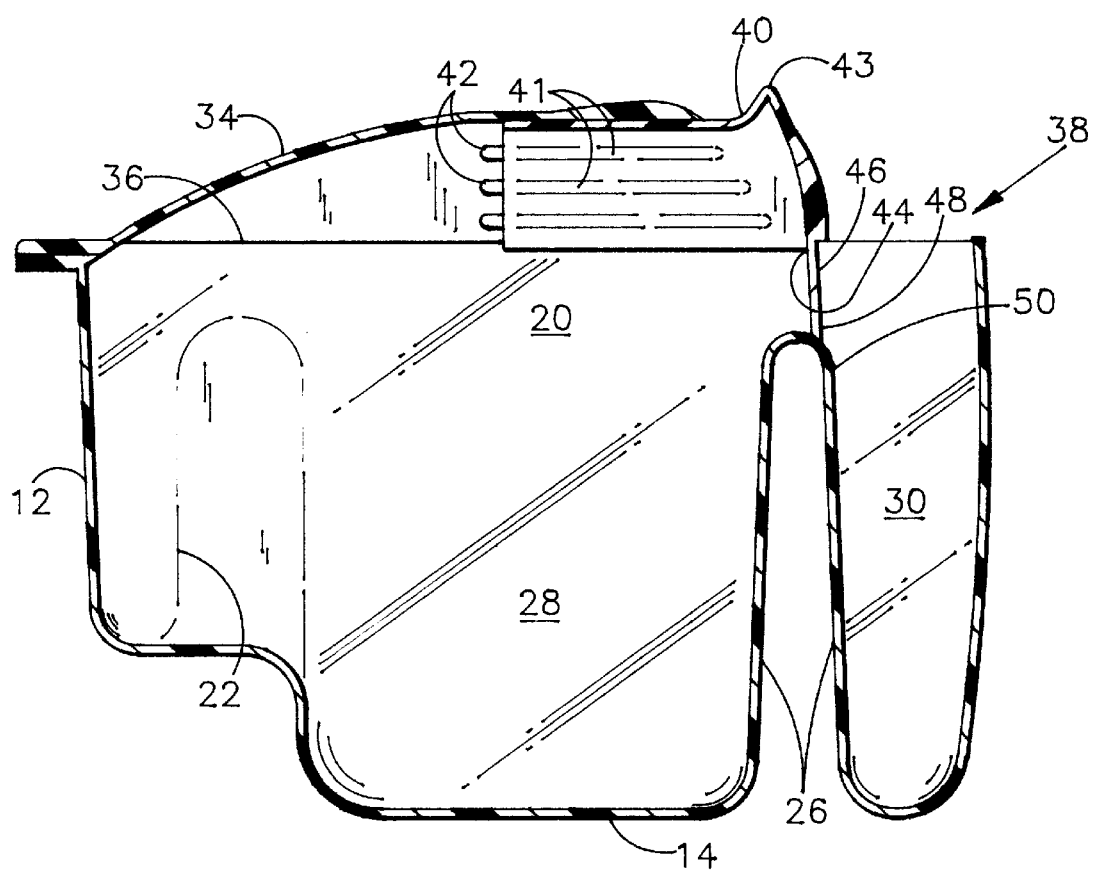
FIG. 5 is a side cross-section view taken along line 5—5 of FIG. 2.
Figure 6:
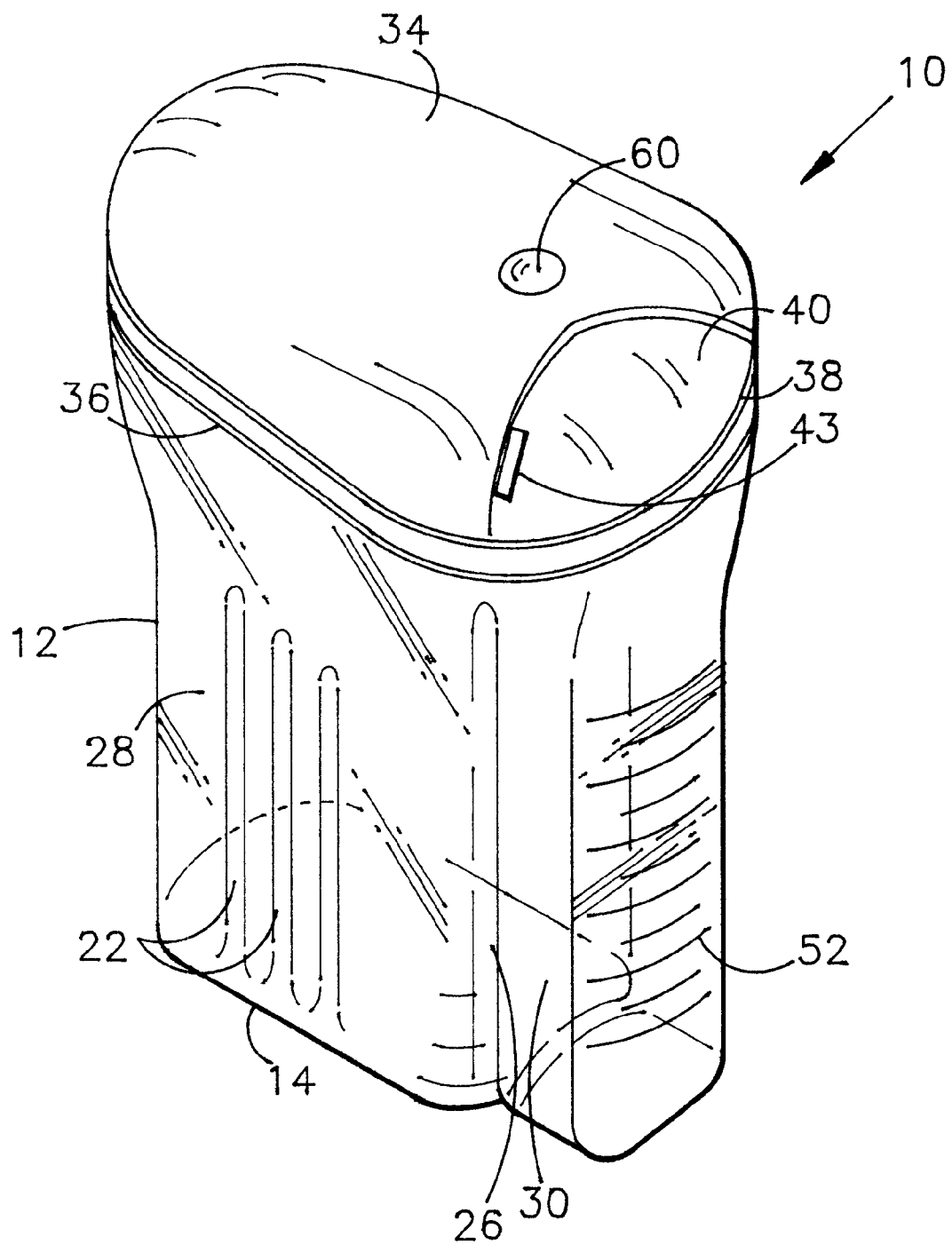
FIG. 6 is a perspective view of a measuring canister representing a second embodiment of the present invention, depicted with the closure in the closed position.
Figure 7:
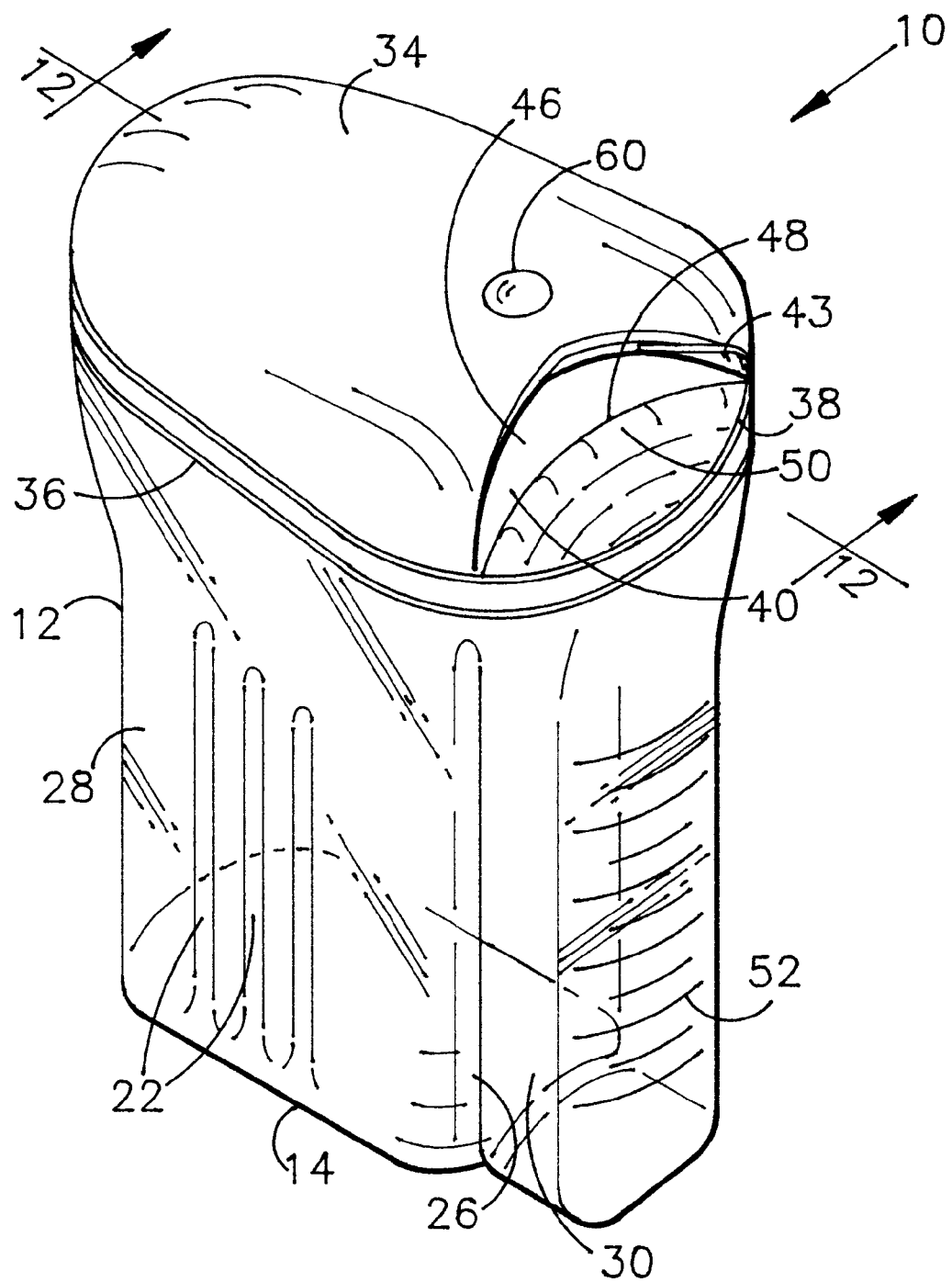
FIG. 7 is a perspective view of a measuring canister representing a second embodiment of the present invention, depicted with the closure in the open position.
Figure 8:
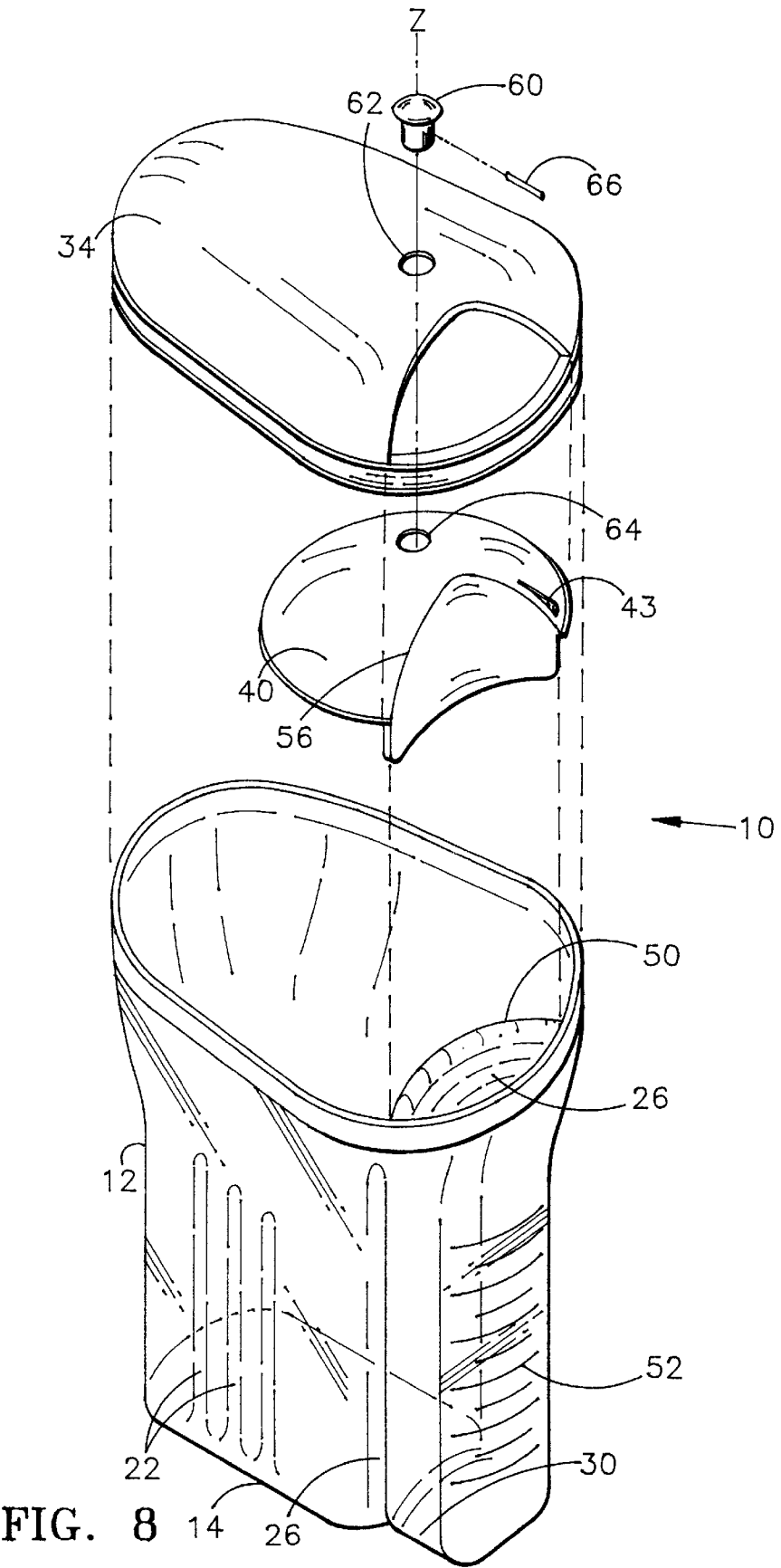
FIG. 8 is an exploded perspective view of a measuring canister representing a second embodiment of the present invention, depicted with the closure in the open position.
Figure 12:
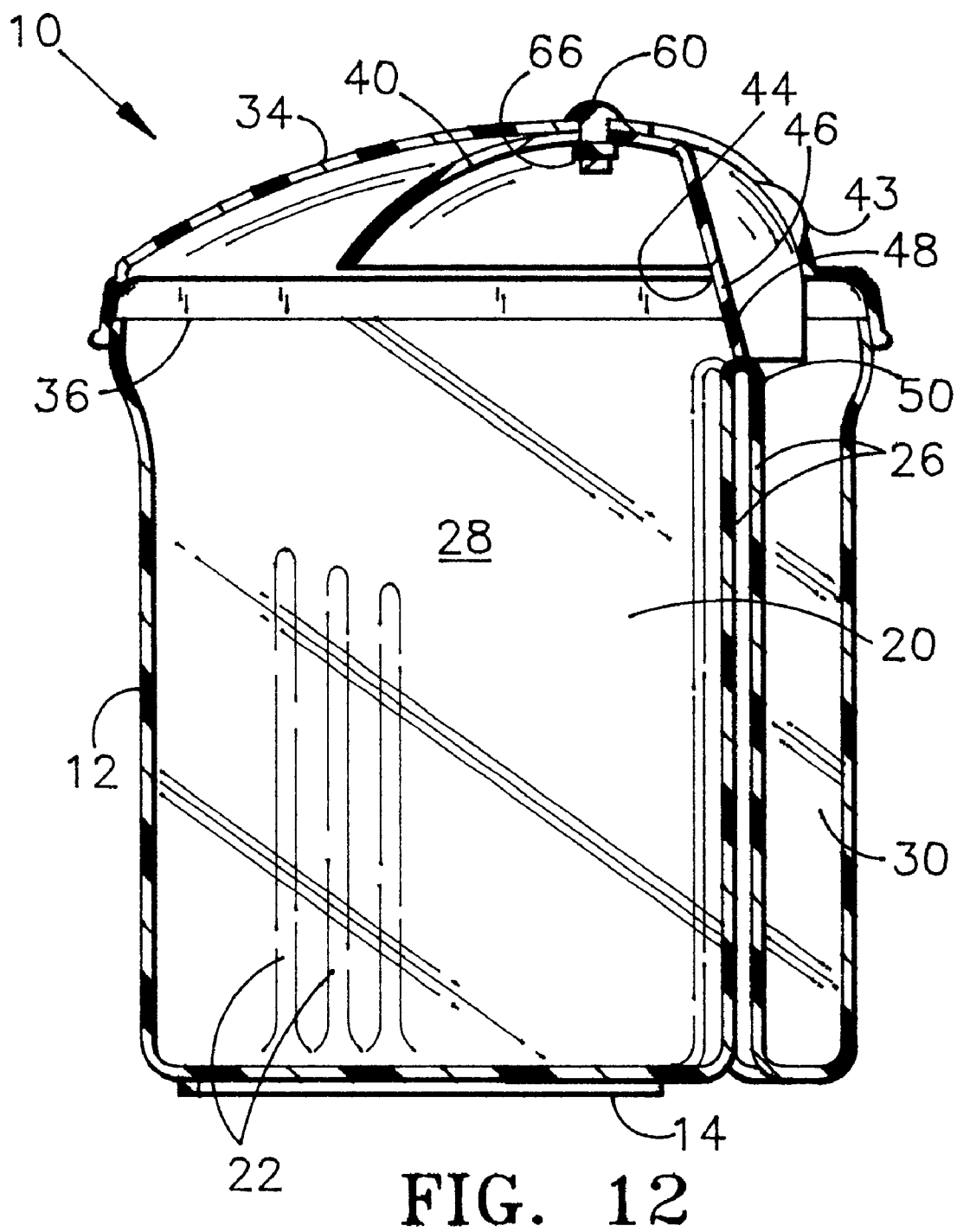
FIG. 12 is a side cross-section view taken along lines 12—12 of FIG. 7.

Additionally, as best seen in FIGS. 2, 4, and 5, closure 40 includes inside surface 44 which facilitates material exchange between storage compartment 28 and measuring dispensing compartment 30 while closure 40 is disposed in the closed position. Closure 40 includes generally downwardly depending flange 46. The dimensions and location of flange 46 are selected so that a lower margin 48 of flange 46 is disposed in proximity with an upper margin 50 of partition 26 when closure 40 is in the open position, thereby preventing material from being exchanged between storage compartment 28 and measuring dispensing compartment 30. Further, when closure 40 is in the closed position, lower margin 48 of flange 46 is separated from upper margin 50 of partition 26, so that material may be exchanged between storage compartment 28 and measuring dispensing compartment 30.

It will of course be recognized that when closure 40 is in the closed position, material is prevented from being dispensed from measuring canister 10 while material is exchanged between storage compartment 28 and measuring dispensing compartment 30. When closure 40 is in the open position, material may be dispensed from measuring dispensing compartment 30 through orifice 38, but material within storage compartment 28 is prevented from moving to measuring dispensing compartment 30 and from being dispensed from measuring canister 10.

Side wall 12 may be formed of a material that is at least partially sufficiently translucent, so as to permit a user of measuring canister 10 to visually determine the amount of material situated in measuring dispensing compartment 30. To further aid in determining the amount of material in measuring dispensing compartment 30, at least a portion of side wall 12 proximate to measuring dispensing compartment 30 may include volumetric indicia 52, whereby a user may accurately determine the volume of material contained in measuring dispensing compartment 30.

As depicted in FIGS. 2–5, upper margin 50 of partition 26 may be disposed to lie substantially below upper margin 36 of side wall 12, and flange 46 may project generally downward from closure 40 to be disposed substantially outside an envelope defined by a perimeter of cover 34 and in proximity with upper margin 50 of partition 26. Alternatively, upper margin 50 of partition 26 may be disposed to lie substantially coplanarly with upper margin 36 of side wall 12, so that flange 46 may be generally confined within the envelope defined by the perimeter of cover 34 while being in proximity of upper margin 50 of partition 26.

In use, cover 34 may be removed from side wall 12, a desired material placed in storage compartment 28, and cover 34 reattached. With closure 40 in the closed position, measuring canister 10 may be tilted to elevate storage compartment 28 with respect to measuring dispensing compartment 30 until a desired amount of the material is transferred from storage compartment 28, over partition 26, and into measuring dispensing compartment 30. During this operation, material is prevented from being dispensed from the present invention as closure 40 closes dispensing orifice 38. Using indicia 52, a user may determine whether the desired volume of material has been transferred to measuring dispensing compartment 30, by visual inspection through the at least partially sufficiently translucent side wall 12. Transfer of material back and forth between storage compartment 28 and measuring dispensing compartment 30 may continue until the desired volume of material is present in measuring dispensing compartment 30. Thereafter, closure 40 is moved to the open position, using tab 43 if desired, where flange 46 is moved proximate to upper margin 50 of partition 26, effectively blocking material from transfer between storage compartment 28 and measuring dispensing compartment 30, and simultaneously uncovering orifice 38. By tilting measuring canister 10, the material present in measuring dispensing compartment 30 may be dispensed, while preventing material within storage compartment 28 from movement to measuring dispensing compartment 30 or from being dispensed from the present invention.

In a second embodiment of the present invention, as depicted in FIGS. 6–12, partition 26 is generally arcuate. Closure 40 is generally disk-shaped and defines a cutout portion 56 adjacent to arcuate flange 46. The dimensions of cutout portion 56 are chosen to correspond with the dimensions of dispensing orifice 38. Closure 40 is rotationally movable about a vertical axis Z between a closed position illustrated in FIG. 6, and an open position illustrated in FIG. 7. Rotation of closure 40 with respect to cover 34 is facilitated by retainer pin 60 disposed through cover hole 62 defined through cover 34 and closure hole 64 defined through closure 40. Retainer pin 60 is held in place by dowel pin 66. Rotational movement of closure 40 may be accomplished using tab 43.

As previously discussed, when closure 40 is in the open position, lower margin 48 of flange 46 is disposed in proximity of upper margin 50 of partition 26, preventing material from being exchanged between storage compartment 28 and measuring dispensing compartment 30. When closure 40 is disposed in the closed position, lower margin 48 of flange 46 is separate from upper margin 50 of partition 26, and material may be exchanged between storage compartment 28 and measuring dispensing compartment 30.

The present invention having been described in its preferred embodiments, it is clear that it is susceptible also to numerous modifications and embodiments within the ability of those skilled in the art and without the exercise of the inventive faculty. Accordingly, the scope of the present invention is defined as set forth by the scope of the following claims.

What is claimed is:

1. A measuring canister comprising: a bottom and a side wall connected to the bottom defining an interior of the canister, a partition dividing the interior into a storage compartment and a measuring dispensing compartment, and a cover including a dispensing orifice joined to an upper margin of the side wall so that the dispensing orifice is located only over the measuring dispensing compartment, a closure slidably disposed inside the cover and movable between an open position allowing material to be dispensed from the measuring dispensing compartment and a closed position preventing the material from being dispensed therefrom, the closure having an inside surface facilitating material exchange between the storage and the measuring dispensing compartments while the closure is in the closed position, the closure including a downwardly depending flange having a lower margin which is in proximity of an upper margin of the partition for preventing material from being exchanged between the storage and the measuring dispensing compartments of the canister while the closure is in the open position.

2. The measuring canister of claim 1 and further comprising a manually operable tab projecting upward from the closure through the dispensing orifice to assist in displacing the closure between the open and closed positions.

3. The measuring canister of claim 1 wherein the cover is upwardly domed substantially above the upper margin of the side wall.

4. The measuring canister of claim 1 further comprising means for removably attaching the cover to the upper margin of the side wall so that the cover can be removed to permit refilling of the canister.

5. The measuring canister of claim 1 wherein the side wall is at least partially sufficiently translucent to permit a visual determination of the amount of material situated in the measuring dispensing compartment.

6. The measuring canister of claim 1 wherein at least a portion of the side wall forming the measuring dispensing compartment includes volumetric indicia to permit accurate measurement of the material contained therein.

7. The measuring canister of claim 1 wherein the closure is linearly displaceable between the open and the closed position.

8. The measuring canister of claim 1 wherein the closure is rotatably displaceable between the open and the closed position.

9. The measuring canister of claim 1 wherein the partition upper margin is situated substantially coplanarly with the side wall upper margin, the downwardly depending flange lower margin being generally confined within an envelope defined by a perimeter of the cover.

10. The measuring canister of claim 1 wherein the partition upper margin lies substantially below the side wall upper margin, the downwardly depending flange projecting downward substantially outside an envelope defined by a perimeter of the cover.

11. A measuring canister comprising: a bottom and a side wall connected to the bottom defining an interior of the canister, a substantially vertical partition connected to the bottom and to the side wall dividing the interior into a storage compartment and a measuring dispensing compartment, and an upwardly domed cover including a dispensing orifice removably joined to an upper margin of the side wall so that the dispensing orifice is located only over the measuring dispensing compartment, a closure slidably disposed inside the cover and linearly movable between an open position allowing material to be dispensed from the measuring dispensing compartment and a closed position preventing the material from being dispensed therefrom, the closure having an inside surface facilitating material exchange between the storage and the measuring dispensing compartments while the closure is in the closed position, the closure including a downwardly depending flange having a lower margin which is in proximity of an upper margin of the partition for preventing material from being exchanged between the storage and the measuring dispensing compartments of the canister while the closure is in the open position.

12. The measuring canister of claim 11 and further comprising a manually operable tab projecting upward from the closure through the dispensing orifice to assist in displacing the closure between the open and closed positions.

13. The measuring canister of claim 11 wherein the side wall is at least partially sufficiently translucent and includes volumetric indicia to permit a visual determination of the amount of material situated in the measuring dispensing compartment.

14. The measuring canister of claim 11 wherein the partition upper margin lies substantially below the side wall upper margin, the downwardly depending flange projecting downward substantially outside an envelope defined by a perimeter of the cover.

15. A measuring canister comprising: a bottom and a side wall connected to the bottom defining an interior of the canister, a substantially vertical partition connected to the bottom and to the side wall dividing the interior into a storage compartment and a measuring dispensing compartment, and an upwardly domed cover including a dispensing orifice removably joined to an upper margin of the side wall so that the dispensing orifice is located only over the measuring dispensing compartment, a closure slidably disposed inside the cover and rotationally movable about a vertical axis between an open position allowing material to be dispensed from the measuring dispensing compartment and a closed position preventing the material from being dispensed therefrom, the closure having an inside surface facilitating material exchange between the storage and the measuring dispensing compartments while the closure is in the closed position, the closure including a downwardly depending flange having a lower margin which is in proximity of an upper margin of the partition for preventing material from being exchanged between the storage and the measuring dispensing compartments of the canister while the closure is in the open position.

16. The measuring canister of claim 15 and further comprising a manually operable tab projecting upward from the closure through the dispensing orifice to assist in displacing the closure between the open and closed positions.

17. The measuring canister of claim 15 wherein the side wall is at least partially sufficiently translucent and includes volumetric indicia to permit a visual determination of the amount of material situated in the measuring dispensing compartment.

18. The measuring canister of claim 15 wherein the partition upper margin lies in substantially the same plane as the side wall upper margin, the downwardly depending flange lower margin being generally confined within an envelope defined by a perimeter of the cover.

* * * * *